US010270654B2

(12) United States Patent
Castagna et al.

(10) Patent No.: US 10,270,654 B2
(45) Date of Patent: Apr. 23, 2019

(54) SYSTEM FOR INCREASING COMPUTING EFFICIENCY OF COMMUNICATION BETWEEN APPLICATIONS RUNNING ON NETWORKED MACHINES

(71) Applicant: Bank of America Corporation, Charlotte, NC (US)

(72) Inventors: Brandon Matthew Castagna, Mount Holly, NC (US); Suresh Jagarlamudi, Matthews, NC (US); Kevin Ben Hicks, Huntersville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 327 days.

(21) Appl. No.: 15/241,940

(22) Filed: Aug. 19, 2016

(65) Prior Publication Data
US 2018/0054358 A1    Feb. 22, 2018

(51) Int. Cl.
*G06F 15/177* (2006.01)
*H04L 12/24* (2006.01)
*H04L 29/08* (2006.01)
*H04L 12/26* (2006.01)
*H04L 29/06* (2006.01)

(52) U.S. Cl.
CPC .......... *H04L 41/0816* (2013.01); *H04L 43/50* (2013.01); *H04L 67/02* (2013.01); *H04L 67/10* (2013.01); *H04L 69/08* (2013.01)

(58) Field of Classification Search
CPC ..... H04L 41/0816; H04L 69/08; H04L 43/50; H04L 67/10; H04L 67/02
See application file for complete search history.

(56) References Cited

U.S. PATENT DOCUMENTS

| | | |
|---|---|---|
| 6,105,147 A | 8/2000 | Molloy |
| 6,550,052 B1 | 4/2003 | Joyce et al. |
| 7,069,546 B2 | 6/2006 | Tsarfati |
| 7,454,422 B2 | 11/2008 | Chan |
| 7,818,757 B1 | 10/2010 | Tsimelzon et al. |
| 7,934,116 B2 | 4/2011 | Mehrdad |
| 8,121,966 B2 | 2/2012 | Routray et al. |
| 8,132,043 B2 | 3/2012 | Dash et al. |
| 8,433,768 B1 | 4/2013 | Bush et al. |
| 8,572,431 B2 | 10/2013 | Adler et al. |
| 8,661,407 B2 | 2/2014 | Siegemund et al. |
| 8,938,456 B2 | 1/2015 | Chappell et al. |
| 9,077,659 B2 | 7/2015 | Armstrong et al. |
| 9,110,758 B2 | 8/2015 | Bridges |
| 9,148,369 B2 | 9/2015 | Armstrong et al. |
| 9,244,811 B1 | 1/2016 | Kulkarni et al. |

(Continued)

*Primary Examiner* — Richard G Keehn
(74) *Attorney, Agent, or Firm* — Michael A. Springs; Moore & Van Allen PLLC; James C. Edwards

(57) ABSTRACT

Embodiments of the present invention provide a system for increasing computing efficiency of communication between applications running on networked machines through embedded middleware. Embodiments of the invention allow disparate applications to communicate with one another by using middleware that is integrated into the applications themselves, thereby reducing the various types of computing resources required to establish and maintain the communications link, including, but not limited to, processing power, memory space, storage space, cache space, electric power, networking bandwidth, and I/O calls.

18 Claims, 8 Drawing Sheets

(56) References Cited

U.S. PATENT DOCUMENTS

| | | |
|---|---|---|
| 9,372,767 B2 | 6/2016 | Holtz et al. |
| 2002/0188653 A1 | 12/2002 | Sun |
| 2005/0125557 A1 | 6/2005 | Vasudevan |
| 2005/0209832 A1 | 9/2005 | Kasravi et al. |
| 2006/0123425 A1* | 6/2006 | Ramarao ............... H04L 69/08 719/313 |
| 2006/0168334 A1* | 7/2006 | Potti ..................... H04L 67/02 709/239 |
| 2007/0005786 A1* | 1/2007 | Kumar ................... H04L 67/02 709/230 |
| 2007/0043726 A1 | 2/2007 | Chan |
| 2007/0043975 A1 | 2/2007 | Varadarajan et al. |
| 2007/0180302 A1 | 8/2007 | Allen |
| 2007/0198997 A1 | 8/2007 | Jacops et al. |
| 2007/0239728 A1 | 10/2007 | Smits |
| 2008/0141263 A1 | 6/2008 | Song et al. |
| 2008/0162590 A1 | 7/2008 | Kundu |
| 2010/0332532 A1 | 12/2010 | Joshi et al. |
| 2011/0302140 A1 | 12/2011 | Gokhale |
| 2012/0198287 A1 | 8/2012 | Day et al. |
| 2012/0215740 A1 | 8/2012 | Valliant et al. |
| 2012/0216073 A1 | 8/2012 | Douros et al. |
| 2013/0097457 A1 | 4/2013 | Drucker |
| 2014/0081916 A1 | 3/2014 | McAlister |
| 2014/0304545 A1 | 10/2014 | Chen et al. |
| 2015/0149823 A1 | 5/2015 | McCarthy et al. |
| 2015/0212906 A1 | 7/2015 | Gschwind et al. |
| 2015/0347245 A1 | 12/2015 | Andre et al. |
| 2016/0094420 A1 | 3/2016 | Clemm et al. |
| 2016/0239396 A1 | 8/2016 | Deng et al. |
| 2018/0052739 A1 | 2/2018 | Castagna |
| 2018/0052747 A1 | 2/2018 | Castagna et al. |

\* cited by examiner

SYSTEM FOR INCREASING COMPUTING EFFICIENCY OF COMMUNICATION BETWEEN APPLICATIONS RUNNING ON NETWORKED MACHINES

BACKGROUND

In the computing space, middleware is often used to perform integrations of systems and applications, thus serving as a communication and data exchange intermediary between the systems and applications. The usage of middleware allows disparate systems and applications to run processes and share services without the ability or need for establishing direct communication with one another. Typically, middleware exists as a separate and distinct software entity from the applications that it seeks to connect.

However, traditional forms of middleware as described above introduce a number of problems. For instance, the fact that middleware exists outside of the applications necessarily requires the individual applications to be specifically programmed to communicate with the middleware. In other words, the application must contain both logic (i.e. payload) code as well as middleware-facing code to communicate with the external middleware. If the configuration of the middleware were to change, for instance due to a change in industry standards for integration, it will become necessary to modify the code for both the middleware and the application to enable communication via the new standard. This can be costly to implement and may consume resources that could otherwise be spent improving the logic code. Furthermore, the execution of traditional forms of middleware imposes a heavy burden on computing resources such as processing power and network efficiency, due to the relatively large overheads associated with the large sizes of the applications and the middleware.

Accordingly, there is a need for a more resource-efficient way to facilitate communication between systems and applications, as well as an easier way to ensure compatibility with new developments in communication protocols.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system for increasing computing efficiency of communications between applications running on networked machines, wherein the system comprises an upstream networked system comprising an upstream processor, a memory device, and a communication device, and an upstream application stored in the memory, comprising computer-readable instructions comprising a first logic code portion and a first embedded code portion comprising a common application framework and a first middleware portion, the first middleware portion being in communication with the first logic code portion via the common application framework of the first embedded code portion, wherein the first logic code portion and the first middleware portion are configured to be modified independently of one another. The system further comprises a downstream networked system operatively connected with the upstream networked system over the network, the downstream networked system comprising a downstream processor, a memory device, and a communication device, and a downstream application stored in the memory, comprising computer-readable instructions comprising a second logic code portion and a second embedded code portion comprising the common application framework and a second middleware portion, the second middleware portion being in communication with the second logic code portion via the common application framework of the second embedded code portion, wherein the second logic code portion and the second middleware portion are configured to be modified independently of one another.

The first middleware portion when executed by the upstream processor causes the upstream processor to receive, from the first logic code portion, a set of data to be communicated to the downstream application; transform the set of data into a format capable of being read by the second middleware portion; and transmit, over the network, the set of data to the second middleware portion via a first communications protocol.

The second middleware portion when executed by the downstream processor causes the downstream processor to receive, over the network, the set of data from the first middleware portion via the first communications protocol; transform the set of data into a format capable of being read by the second logic code portion; and communicate the set of data to the second logic code portion.

In some embodiments, the first communications protocol is IBM MQ.

In some embodiments, the first middleware portion is further configured to cause the downstream processor to detect a condition that renders the first communications protocol unavailable and automatically transmit, over the network, the set of data to the second middleware portion via a second communications protocol. In such an embodiment, the second middleware portion is further configured to cause the upstream processor to detect the condition that renders the first communications protocol unavailable and automatically receive, over the network, the set of data from the first middleware portion via the second communications protocol. In some embodiments, the common application framework is configured to select the first communications protocol and the second communications protocol based on communications protocol availability of the applications in which the common application framework is deployed.

In some embodiments, the second communications protocol is Hypertext Transfer Protocol (HTTP).

In some embodiments, the system further comprises a s first smart stub embedded in the common application framework of the first embedded code portion, wherein the first smart stub is in communication with the first middleware portion and the first logic code portion, and is configured to cause the upstream processor to detect, via a smart stub manager, that communication with the downstream application is unavailable and enable a data transfer testing mode. In some embodiments, configuring the first smart stub to cause the upstream processor to receive the set of data from the first logic code portion and configure the first middleware portion to send, over the network, the set of data to the second middleware portion, wherein the second middleware portion is configured by a second smart stub to cause the downstream processor to send, over the network, a simulated response to the first logic code portion.

In some embodiments, the system further comprises an alternate networked system operatively connected with the upstream networked system over a network, the alternate networked system comprising an alternate processor, a memory device, and a communication device, and an alternate application stored in the memory, comprising computer-readable instructions comprising a third logic code portion and a third embedded code portion comprising the common application framework and a third middleware portion, the third middleware portion being in communication with the third logic code portion via the common application framework of the third embedded code portion, wherein the third logic code portion and the third middleware portion are configured to be modified independently of one another. In such an embodiment, the data transfer testing mode comprises configuring the first smart stub to cause the upstream processor to receive the set of data from the first logic code portion and configure the first middleware portion to send, over the network, the set of data to a third middleware portion of the alternate application, wherein the third middleware portion is configured by a third smart stub to cause the alternate processor to send, over the network, a simulated response to the first logic code portion.

In some embodiments, the first smart stub is further configured to cause the upstream processor to detect that communication with the second middleware portion is available and disable the data transfer testing mode.

In some embodiments, the first middleware portion is further configured to cause the upstream processor to detect a condition that necessitates a change in configuration of the first middleware portion; receive a first update from an update server; and dynamically modify the configuration of the first middleware portion independently of the first logic code portion. In some embodiments, the second middleware portion is further configured to cause the downstream processor to detect a condition that necessitates a change in configuration of the second middleware portion; receive a second update from the update server; and dynamically modify the configuration of the second middleware portion independently of the second logic code portion.

According to one embodiment of the invention, a computer-implemented method for increasing efficiency of communication between applications is provided and includes the method being performed by an upstream processor of an upstream networked system, the upstream networked system further comprising a memory device and a communication device, wherein an upstream application is stored on the memory device, the upstream application comprising a first logic code portion and a first embedded code portion comprising a common application framework and a first middleware portion, the first middleware portion being in communication with the first logic code portion via the common application framework of the first embedded code portion, wherein the first logic code portion and the first middleware portion are configured to be modified independently of one another. The method is further performed by a downstream processor of a downstream networked system, the downstream networked system further comprising a memory device and a communication device, wherein a downstream application is stored on the memory device, the downstream application comprising a second logic code portion and a second embedded code portion comprising a common application framework and a second middleware portion, the second middleware portion being in communication with the second logic code portion via the common application framework of the second embedded code portion, wherein the second logic code portion and the second middleware portion are configured to be modified independently of one another. The method comprises configuring the first middleware portion to cause the upstream processor to receive a set of data from the first logic code portion at the first middleware portion over a network; transform the set of data into a format that is readable by the second middleware portion; and transmit the set of data to the second middleware portion over a network. The method further comprises configuring the second middleware portion to cause the downstream processor to receive the set of data from the first middleware portion at the second middleware portion over the network; transform the set of data into a format that is readable by the second logic code portion; and communicate the data to the second logic code portion.

In some embodiments, the computer-implemented method further includes configuring the first middleware portion to cause the upstream processor to detect a condition that renders the first communications protocol unavailable and automatically transmit, over the network, the set of data to the second middleware portion via a second communications protocol. In such an embodiment, the computer-implemented method further includes configuring the second middleware portion to cause the downstream processor to automatically receive, over the network, the set of data from the first middleware portion via the second communications protocol. In some embodiments, the common application framework is configured to select the second communications protocol based on communications protocol availability for both the upstream application and downstream application.

In some embodiments, the computer-implemented method further includes configuring the first middleware portion to cause the upstream processor to detect, via a smart stub manager, that communication with the downstream application is unavailable and detect a data transfer testing mode via a first smart stub embedded in the common application framework. In some embodiments, the data transfer testing mode comprises configuring the first smart stub to cause the upstream processor to receive the set of data from the first logic code portion and return a simulated response to the first logic code portion.

In some embodiments, the data transfer testing mode comprises configuring the first smart stub to cause the upstream processor to receive the set of data from the first logic code portion and configure the first middleware portion to send, over the network, the set of data to a third middleware portion of an alternate application, wherein the third middleware portion is configured by a third smart stub to cause an alternate processor send, over the network, a simulated response to the first logic code portion.

In some embodiments, the computer-implemented method wherein the data transfer testing mode comprises configuring the first smart stub to receive the set of data from the first logic code portion and configure the first middleware portion to send, over the network, the set of data to the second middleware portion, wherein the second middleware portion is configured by a second smart stub to send, over the network, a simulated response to the first logic code portion.

In some embodiments, the computer-implemented method further includes detecting that communication with the second middleware portion is available; and disabling the data transfer testing mode.

In some embodiments, the computer-implemented method further includes configuring the first middleware portion to cause the upstream processor to detect a condition that necessitates a change in configuration of the first middleware portion; receive a first update from an update server; and dynamically modify the configuration of the first middleware portion independently of the first logic code portion. In such an embodiment, the method further includes configuring the second middleware portion to cause the downstream processor to detect a condition that necessitates a change in configuration of the second middleware portion; receive a second update from the update server; and dynamically modify the configuration of the second middleware portion independently of the second logic code portion.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
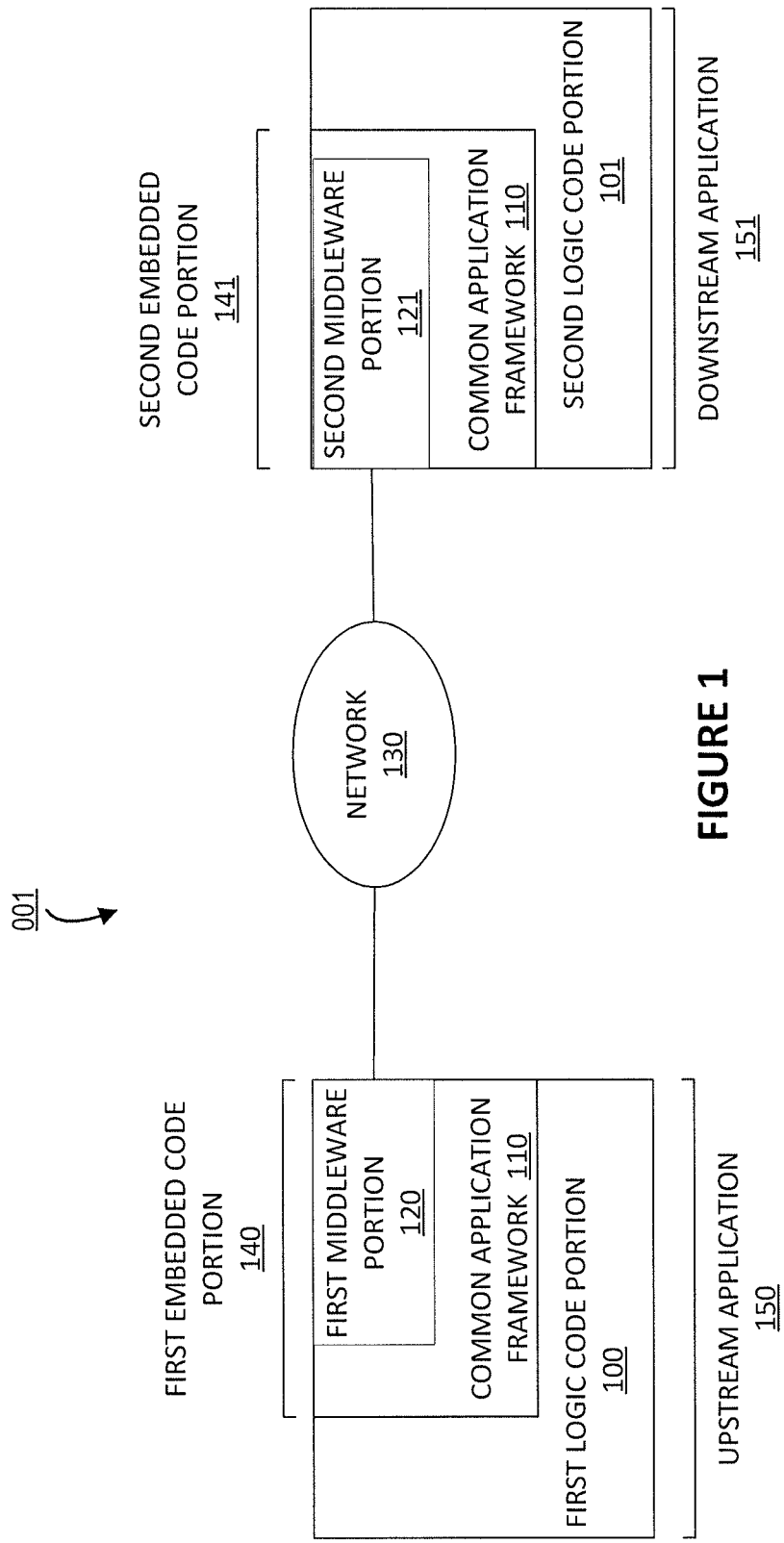
Figure 2:
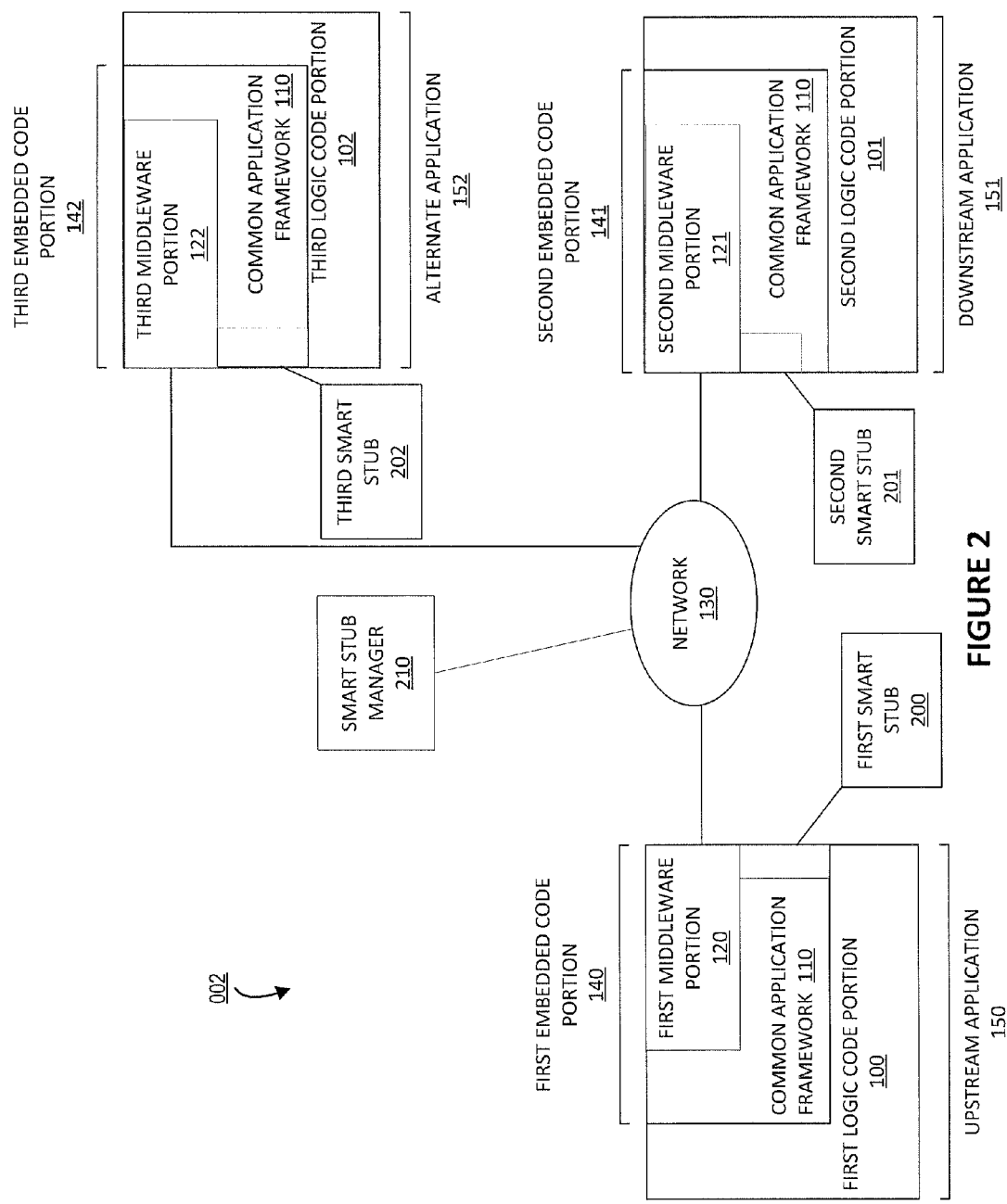
Figure 3:
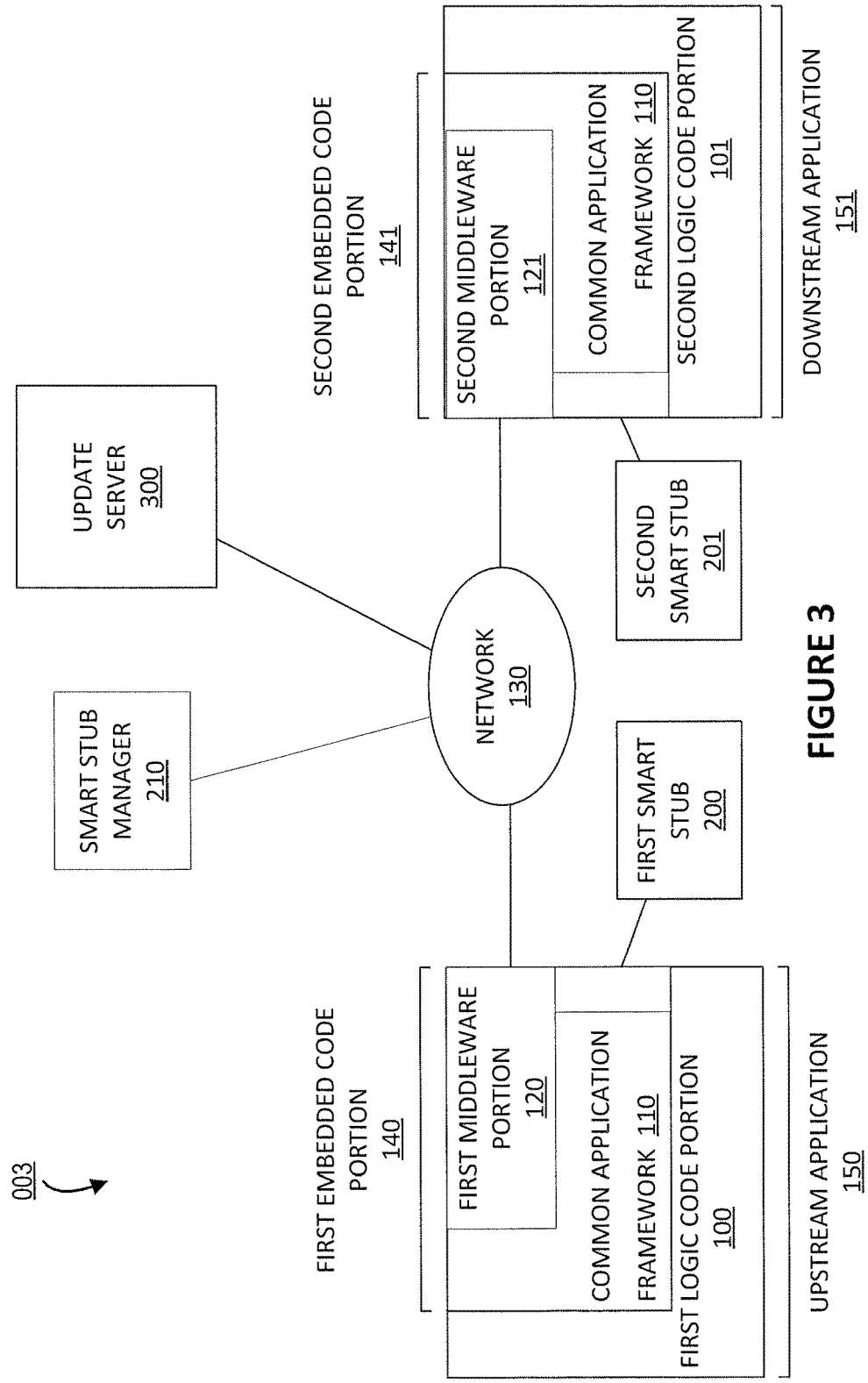
Figure 4:
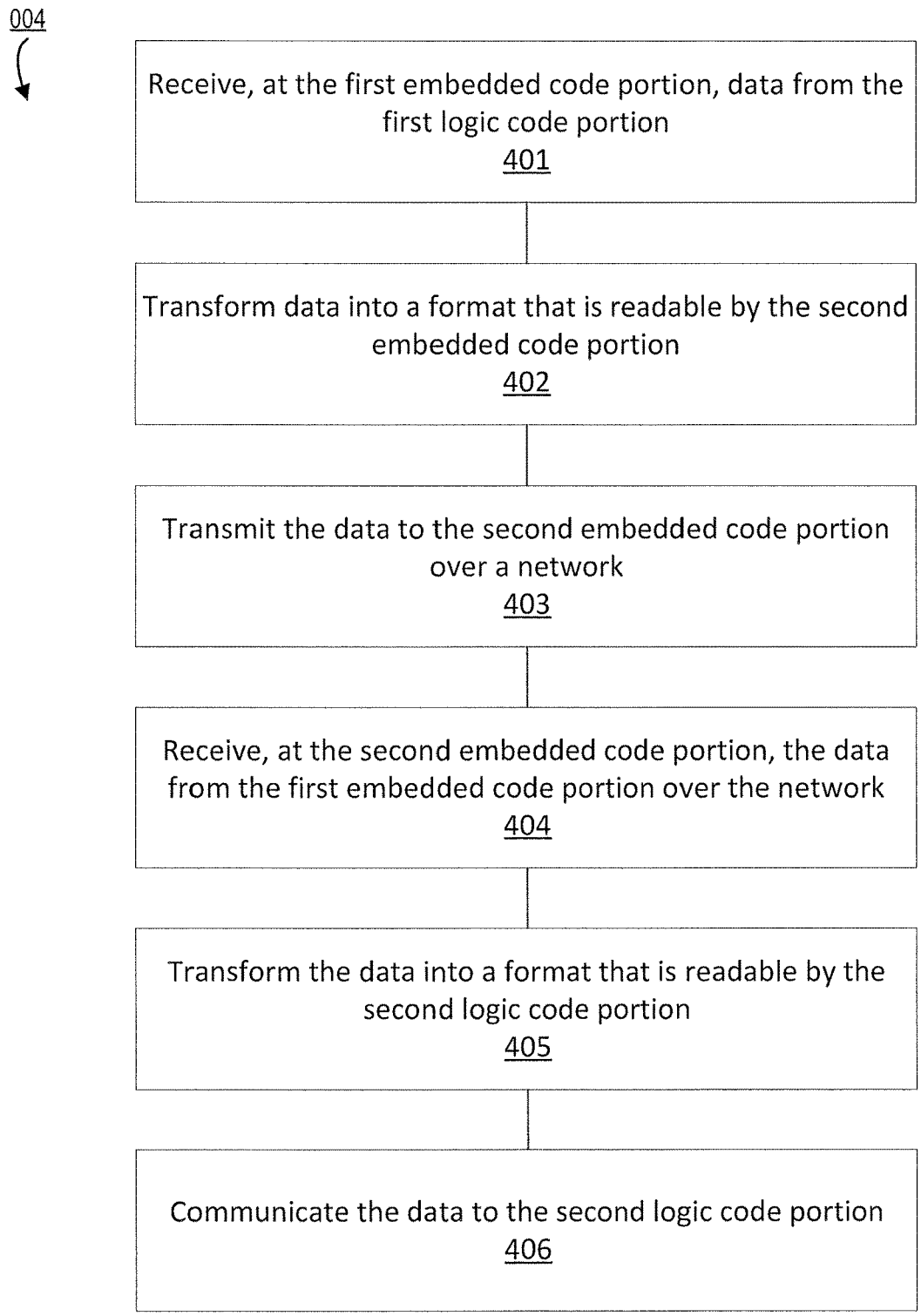
Figure 5:
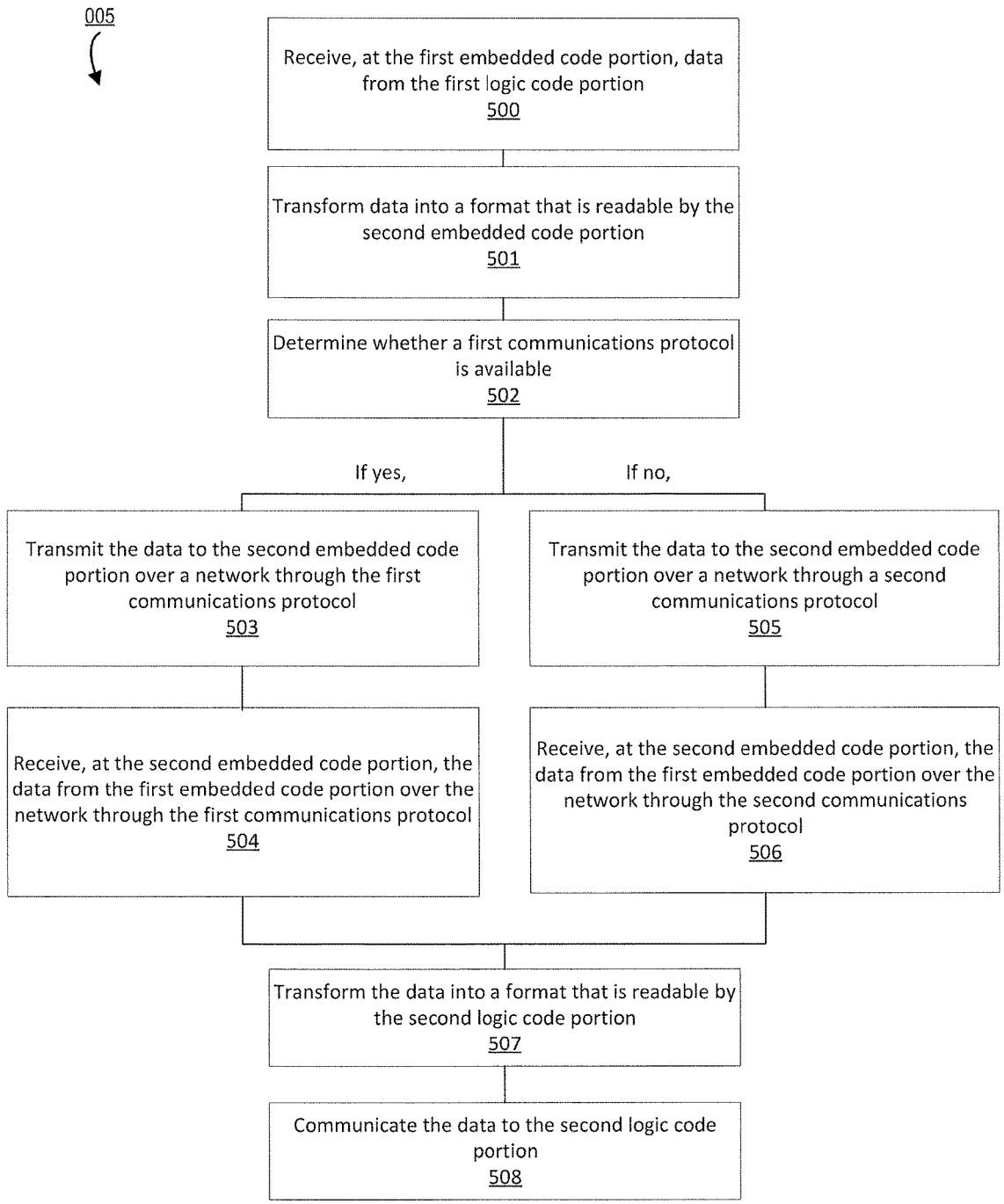
Figure 6:
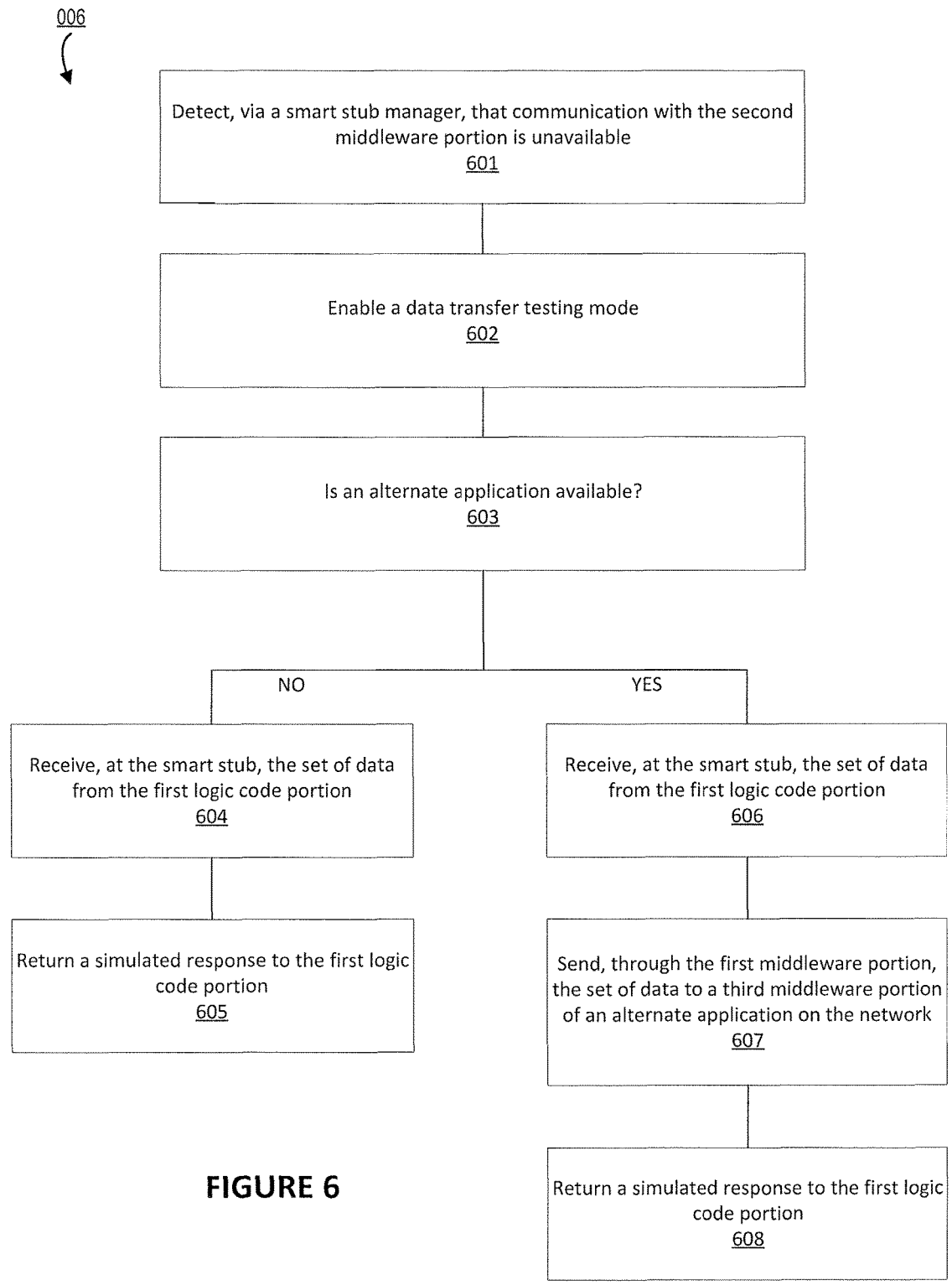
Figure 7:
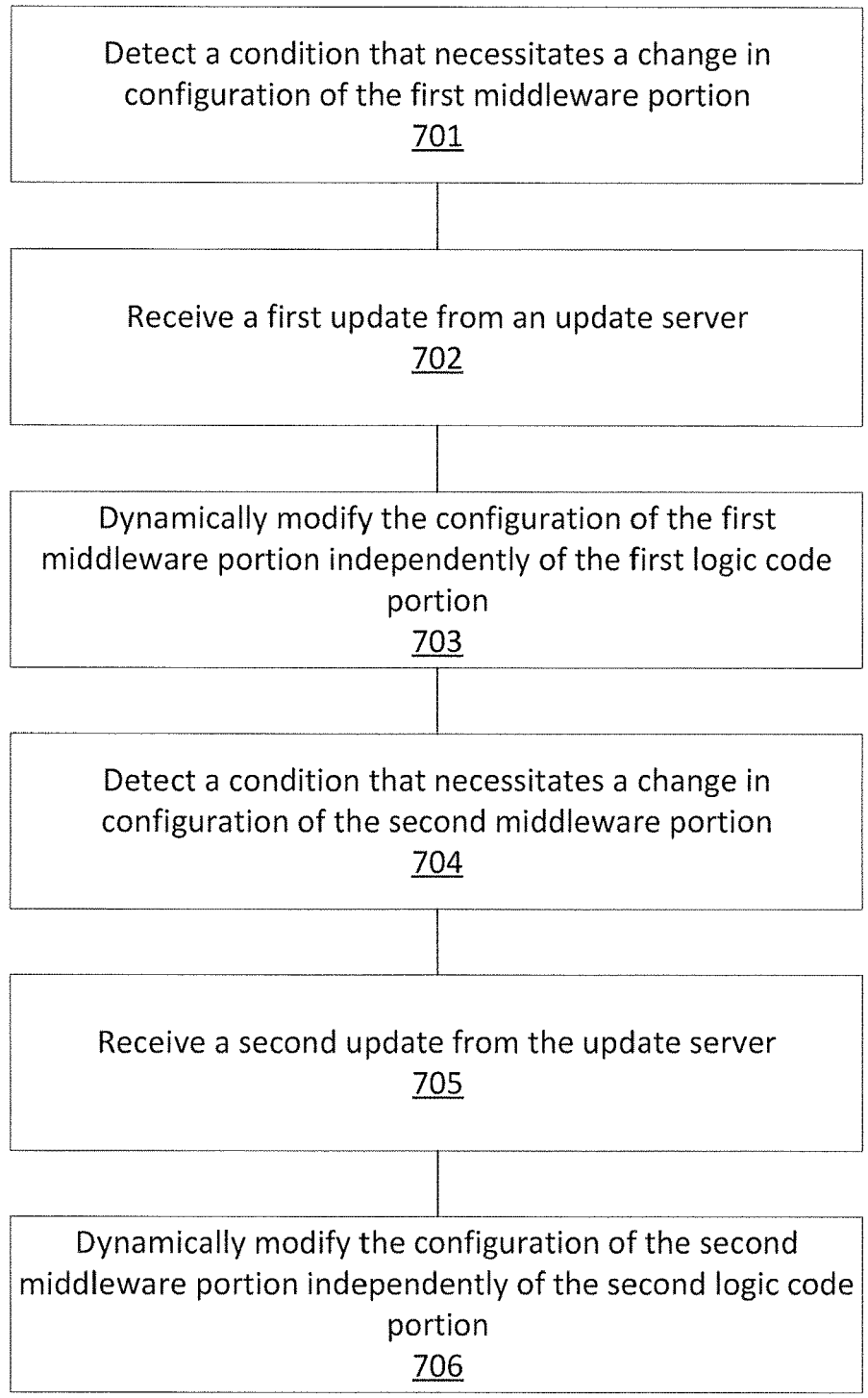
Figure 8:
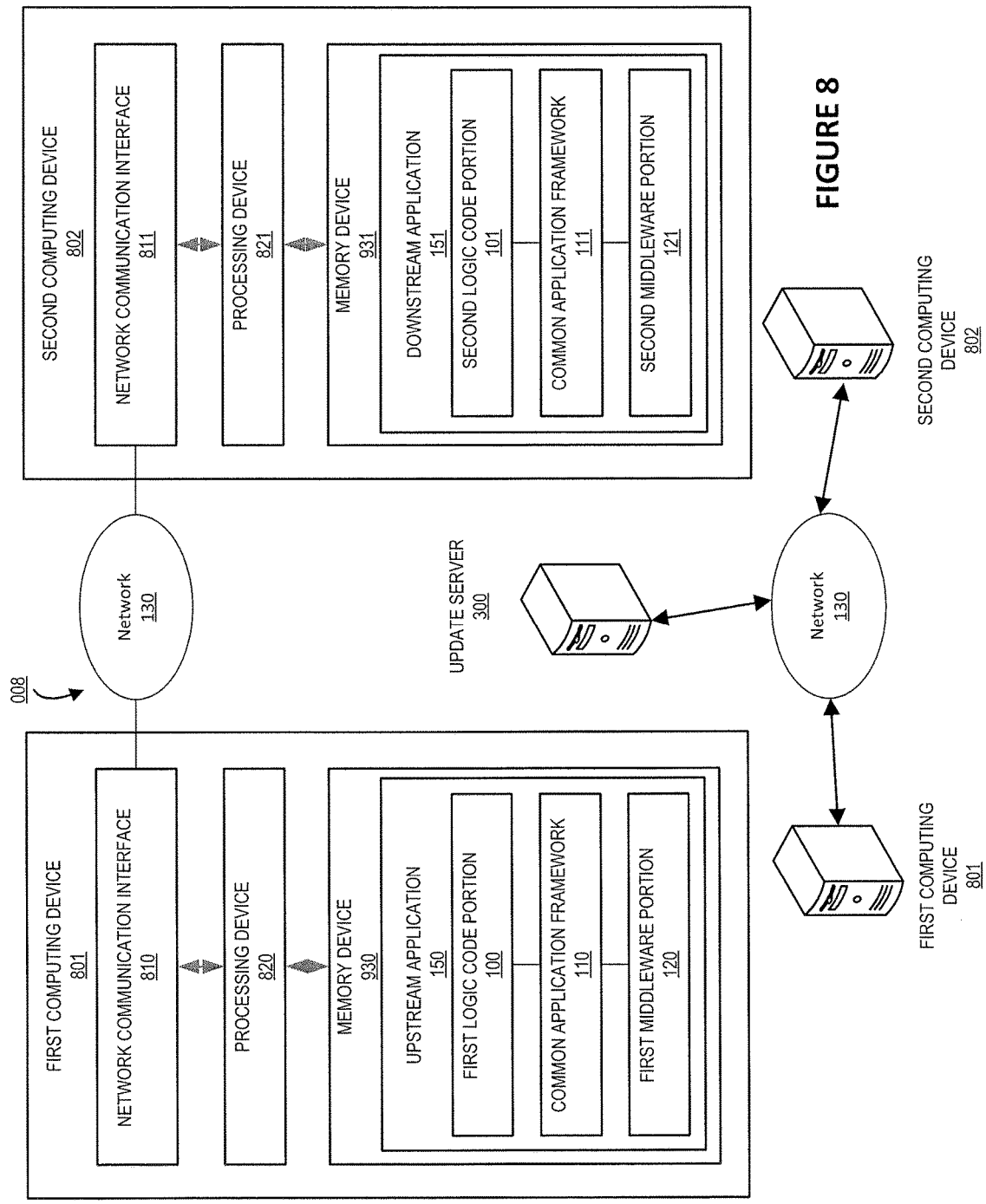

Having thus described embodiments of the invention in general terms, reference will now be made to the accompanying drawings, wherein:

FIG. 1 provides a high level overview of a system for increasing computing efficiency of communication between applications running on networked machines through embedded middleware, according to embodiments of the invention;

FIG. 2 provides a backend testing environment for the system, according to embodiments of the invention;

FIG. 3 provides a dynamic update environment for the system, according to embodiments of the invention;

FIG. 4 provides a high level process flow illustrating use of embedded middleware to facilitate communication between applications, according to embodiments of the invention;

FIG. 5 provides a process flow illustrating a method of dynamically switching communications protocols based on availability, according to embodiments of the invention;

FIG. 6 provides a process flow illustrating a method of conducting diagnostic testing via a simulated backend, according to embodiments of the invention;

FIG. 7 provides a process flow illustrating use of an update server to provide dynamic updates to the middleware independently of the logic code, according to embodiments of the invention; and FIG. 8 provides a combination symbol and block diagram illustrating the breakdown of devices within the system, according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Embodiments of the present invention provide a system for increasing computing efficiency of communication between applications running on networked machines through embedded middleware. The embodiments solve the computer networking-centric problems discussed above by enabling disparate applications to communicate with one another by using middleware that is fully integrated into the applications themselves, thereby reducing, in comparison to traditional forms of external middleware, the various types of computing resources required to establish and maintain the communications link, including, but not limited to, processing power, memory space, storage space, cache space, electric power, networking bandwidth, and I/O calls. Embodiments of the invention also allow the logic/payload portions of the applications to be modified independently without modifying the application to enable compatibility with an external middleware. Thus, embodiments of the invention provide for improving processing efficiencies of the various systems running applications utilizing the embedded middleware because various processing steps traditionally required in networked systems have been eliminated, such as, communication initiation messaging steps, communication protocol standardization steps and the like. In other words, embodiments of the invention "remove the middle-man" from the communication process and replace the "middle-man" with common application frameworks having embedded middleware portions configured to communicate efficiently with one another without requiring communication initiation messaging steps, communication protocol standardization steps and the like.

Embodiments of the invention employ a common application framework, which enable the logic code portions of each application to remain independent and to be maintained separately from middleware portions. In such embodiments, the logic code portion communicates only with the common application framework, which in turn communicates with the middleware portion. In this way, the logic code portion does not have to be modified to be compatible with the middleware portion directly; so long as the logic code portion is configured to communicate with the common application framework, it will maintain its compatibility even if the middleware portion is modified.

"Logic code portion" refers broadly to a computer-executable program configured to execute certain functions. In some embodiments, the logic code portion may be a program for validating payments for a financial institution.

"Common application framework" refers to computer code that serves as an infrastructure for integrating applications and services. The common application framework serves as the figurative "plumbing" for its integrated components and handles low-level tasks such as those that relate to data pathways and communication between components.

"Middleware" refers to computer code that integrate common functions and services relating to communication and input/output. Middleware serves as a data communications intermediary between distributed applications.

"Embedded code" refers to computer code that has been fully incorporated into an application and thus exists solely within or internal to the application rather than within an external application or device.

FIG. 1 is a block diagram providing an overview of a system 001 for increasing computing efficiency of communication between an upstream application 150 comprising a first logic code portion 100 and a first embedded code portion 140, and a downstream application 151 comprising a second logic code portion 101 and a second embedded code portion 141, according to one or more embodiments of the invention. The first logic code portion 100 is in operative communication with the first middleware portion 120 via a common application framework 110. The first middleware portion 120 is in operative communication with the second middleware portion 121 via a network 130, the second middleware portion 121 being in operative communication with the second logic code portion 101 via the common application framework 110. In such an embodiment, the first logic code portion 100 and the first middleware portion 120 are configured to be modified independently of one another, and likewise, the second logic code portion 101 and the second middleware portion 121 are configured to be modified independently of one another. In some embodiments, the first middleware portion 120 is configured to receive, from the first logic code portion 100, a set of data to be communicated to the downstream application 151; transform the set of data into a format capable of being read by the second middleware portion 121; and transmit, over the network 130, the set of data to the second middleware portion 121 via a first communications protocol. In such an embodiment, the second middleware portion 121 is configured to receive, over the network 130, the set of data from the first middleware portion 120 via the first communications protocol; transform the set of data into a format capable of being read by the second logic code portion 101; and communicate the set of data to the second logic code portion 101.

The network 130 may be a system specific distributive network receiving and distributing specific network feeds and identifying specific network associated triggers. The network 130 may also be a global area network (GAN), such as the Internet, a wide area network (WAN), a local area network (LAN), or any other type of network or combination of networks. The network 130 may provide for wireline, wireless, or a combination wireline and wireless communication between devices on the network 130.

"Communications protocol" refers to any number of network protocols used to receive and transmit data, including, but not limited to, IBM Message Queue (MQ), Hyper Text Transfer Protocol (HTTP), Secure Hyper Text Transfer Protocol (HTTPS), Post Office Protocol (POP), Internet Message Access Protocol (IMAP), File Transfer Protocol (FTP), Secure File Transfer Protocol (SFTP), Point to Point Protocol (PPP), or Real-Time Publish Subscribe (RTPS) protocol. Accordingly, "set of data" may include a request for a file transfer, an electronic message, e-mail, a request for further processing, and the like.

In some embodiments, the first middleware portion 120 is further configured to detect a condition that renders the first communication protocol unavailable and automatically transmit, over the network 130, the set of data to the second middleware portion 121 via a second communications protocol. In such an embodiment, the second middleware portion is further configured to detect the condition that makes the first communications protocol unavailable and automatically receive, over the network 130, the set of data from the first middleware portion 120 via the second communications protocol. In such an embodiment, the change in communications protocol may occur dynamically without modifying the logic code portions of the end point applications. In some embodiments, the first communications protocol is IBM MQ. In some embodiments, the second communications protocol is HTTP. In some embodiments, the condition that renders the first communications protocol may be hardware-imposed, e.g. a latency in the response time of the downstream application 151. In some embodiments, the condition that renders the first communications protocol may be institutionally-imposed, e.g. a temporary ban on using the first communications protocol due to a security breach.

In some embodiments, the common application framework 110 is configured to select the second communications protocol based on communications protocol availability for both the upstream application 150 and downstream application 151. In some embodiments, the common application framework 110 determines communications protocol availability by reading the metadata relating to the integration of applications and services within the framework.

FIG. 2 is a block diagram illustrating the layout of a backend application testing system 002 configured to use smart stubs. As in FIG. 1, the first logic code portion 100 is in operative communication with the first middleware portion 120 via a common application framework 110. The first middleware portion 120 is in operative communication with the second middleware portion 121 via a network 130, the second middleware portion 121 being in operative communication with the second logic code portion 101 via the common application framework 110. As further illustrated in FIG. 2, the system further comprises a first smart stub 200 embedded in the common application framework 110 and a smart stub manager 210 connected to the network 130. "Smart stub" 200, 201, 202 as described herein refers to program code embedded into the common application framework 110 which is used to facilitate backend testing within the system. "Smart stub manager" 210 refers to an application configured to coordinate with the smart stub 200 during in-house testing.

In some embodiments, the first smart stub 200 is in communication with the second middleware portion 121 and the first logic code portion 100. The first smart stub 200 may detect that the downstream application 151 is unavailable. In some embodiments, the first smart stub 200 detects the downstream application's 151 unavailability based on a failed communication attempt by the first middleware portion 120. In some embodiments, the first smart stub 200 may detect that the unavailability through the smart stub manager 210. In such an embodiment, the smart stub manager 210 may be configured to query all applications on the network to keep track of application availability. In some embodiments, the smart stub manager 210 may then periodically send availability information to the embedded smart stubs 200, 201, 202. In some embodiments, the smart stubs 200, 201, 202 may query the smart stub manager for application availability.

In some embodiments, the smart stub 200 may enable a data transfer testing mode. In some embodiments, the data transfer testing mode may occur offline, or locally within the upstream application, even when the upstream application is not connected to the network 130. In such an embodiment, the smart stub is configured to receive data from the first logic code portion 100 and return a response that simulates the response that would be expected by the first logic code portion to be returned by a backend application. In this way, the smart stub 200 simulates a backend application, such as the downstream application 151.

In some embodiments, the data transfer testing mode may occur online, when the downstream application 151 is unavailable, such as by a disconnection of the downstream application 151 from the network 130. In such an embodiment, the smart stub 200 is configured to receive data from the first logic code portion 100 and, according to the instructions from the smart stub manager 210, send the data to an alternate application 152. The data is received by the third middleware portion 122 of the alternate application, which is configured by a third smart stub 202 to return a simulated response to the upstream application 150.

In some embodiments, the unavailability of the downstream application 151 may be caused by an error in the second logic code portion 101. In such an embodiment, the downstream application 151 is unavailable in spite of being connected to the network. In such an embodiment, the smart stub 200 may receive the data from the first logic code portion 100 and send the data to the second middleware portion 121, which is configured by a second smart stub 201 to return a simulated response back to the first logic code portion 100. In this way, backend testing may be facilitated in a situation in which the functioning of the upstream application 150 is not interrupted by a failure in the downstream application 151.

In some embodiments, the first smart stub 200 is further configured to detect that communication with the second middleware portion 121 is available and disable the data transfer testing mode. In this way, the first smart stub 200 allows the system to dynamically switch between a normal mode of operations and a testing mode depending on the status of the applications within the system.

FIG. 3 is a block diagram illustrating the layout of a system 003 for providing live updates to the modules within the common application framework 110. Specifically, an update server 300 is added to the system as it is depicted in FIG. 2. In some embodiments, the first middleware portion 120 is configured to detect a condition that necessitates a change in configuration of the first middleware portion 120, receive a first update from the update server 300, and dynamically modify the configuration of the first middleware portion 120 independently of the first logic code portion 100. In some embodiments, the second middleware portion 121 is configured to detect a condition that necessitates a change in configuration of the second middleware portion 121, receive a second update from the update server 300, and dynamically modify the configuration of the second middleware portion 121 independently of the second logic code portion 101. In some embodiments, the condition that necessitates a change in configuration could be the addition or removal of applications within the system that incorporate the common application framework 110. In some embodiments, the condition may be a shift in industry standards for communication between applications, e.g. a shift from Simple Object Access Protocol (SOAP) web services to web services utilizing an Application Programming Interface (API) using Representational State Transfer (REST) communication. In some embodiments, the first middleware portion 120 may query the update server 300 for the update status of the applications within the network. Based on the update status, the first middleware portion 120 may delay applying the update until the middleware portions of the other applications on the network (e.g. 121) are also ready to apply the update.

FIG. 4 is a flow chart illustrating a process 004 for increasing efficiency of communication between applications. The process starts at block 401 by receiving data from the first logic code portion. In such an embodiment, the data referenced therein refers to data that is intended to be communicated to a downstream application. In some embodiments, the data may refer to a message expressed in XML or JSON format.

The process then continues to block 402, transforming the data into a format that is readable by the second embedded code portion. In such an embodiment, the process transforms the data to be compatible with the middleware portions within the common application framework of the downstream application.

The process continues to block 403, transmitting the data to the second embedded code portion over a network. In such an embodiment, the data is transferred according to a communications protocol that is designated in advance of the transfer based on the availability of the communications protocols of the applications within the system.

The process continues to block 404, receiving, at the second embedded code portion, the data from the first embedded code portion over the network. In some embodiments, the middleware portion of the downstream application receives the data over the network.

The process continues to block 405, transforming the data into a format that is readable by the second logic code portion.

Finally, the process continues to block 406, communicating the data to the second logic code portion.

FIG. 5 is a flow chart illustrating a process 005 for dynamically switching communications protocols based on availability. This allows the system to maximize system uptime without further input from system administrators, thereby greatly increasing efficiency of the system. The process begins at block 500, by receiving, at the first embedded code portion, data from the first logic code portion. As was the case in the embodiment illustrated by FIG. 4, the data referenced therein refers to data that is intended to be communicated to a downstream application.

The process continues to block 501, by transforming the data into a format that is readable by the second embedded code portion.

The process continues to block 502, by determining whether a first communications protocol is available. In some embodiments, the first communications protocol is the default communications protocol and is selected based on the speed of the communication. In other embodiments, the default communications protocol is selected based on the security or the reliability features of the protocol. In some embodiments, the first communications protocol may be IBM MQ.

If it is determined that the first communications protocol is available, then the process continues from block 502 to block 503, transmitting the data to the second embedded code portion over a network through the first communications protocol. In such a case, the process then continues to block 504, receiving, at the second embedded code portion, the data from the first embedded code portion through the first communications protocol over the network.

If it is determined that the first communications protocol is unavailable, then the process continues from block 502 to block 505, by transmitting the data to the second embedded code portion over a network through a second communications protocol. In such a case, the process then continues to block 506, by receiving, at the second embedded code portion, the data from the first embedded code portion over the network through the second communications protocol. In some embodiments, the first communications protocol may be unavailable due to ailments in the system. For instance, the unavailability could be due to a failure of peripheral services or applications responsible for facilitating the communications via the first communications protocol. In other embodiments, the first communications protocol may be unavailable due to latency within the systems or the network caused by attempted use of the first communications protocol. In other embodiments, the first communications protocol may be unavailable due to user-imposed restrictions. For instance, the user may restrict the first communications protocol based on a security breach concerning the first communications protocol.

In some embodiments, the second communications protocol is the backup communications protocol and is selected based on the speed offered by the communications protocol. In other embodiments, the backup communications protocol is selected based on the security or reliability features of the protocol. In some embodiments, the second communications protocol may be HTTP. In some embodiments, the switch to the second communications protocol occurs automatically without user input, with the system automatically selecting the next best communications protocol that is available to all of the relevant applications within the system. In other embodiments, the switch to the second communications protocol may occur has a result of a manual user override.

Whether or not the first communications protocol is available, the process continues from block 504 or block 506 to block 507, by transforming the data into a format that is readable by the second logic code portion.

Finally, the process continues to block 508, by communicating the data to the second logic code portion.

FIG. 6 is a flow chart illustrating a process 006 for providing an internal testing and diagnostics environment for the communications system. The process begins at block 601, by detecting, via a smart stub manager, that communication with the downstream application is unavailable. In some embodiments, the unavailability of the second middleware portion may be caused by a temporary latency in the response time of the downstream application. In other embodiments, the unavailability may be caused by latency within the network. In other embodiments, the unavailability may be caused by an error within the logic code portion of the downstream application.

The process continues to block 602, by enabling a data transfer testing mode. In some embodiments, the smart stub is configured to, upon enabling the data transfer testing mode, dynamically change the configuration of the first middleware portion to transfer the set of data to another application on the network.

The process continues to block 603, by determining whether an alternate application is available on the network. In some embodiments, this determination may be made automatically based on the queries sent by the smart stub manager. In some embodiments, the systems administrator may manually set the data transfer testing mode to occur in an offline mode.

If an alternate application is not available, the process moves from block 603 to block 604, by receiving, at the smart stub, the set of data from the first logic code portion. In some embodiments, the smart stub replaces the downstream application, or serves as the downstream application for the purposes of the data transfer testing mode. In such an embodiment, the logic code portion referred to in FIGS. 1-3 is unaware that the data is being rerouted to the smart stub manager and continues to carry out its functions (i.e. communicating with services and applications through the common application framework) without any changes in configuration. In this way, the data transfer testing can be carried out without any modifications to the logic code portions, which greatly increases the ease with which testing is conducted, thereby improving the overall reliability of the system.

The process then continues to block 605, by returning a simulated response to the first logic code portion. In some embodiments, the simulated response is the input that is expected by the first logic code portion in response to the output call.

If an alternate application is available, the process moves from block 603 to block 606, by receiving, at the smart stub, the set of data from the first logic code portion.

The process continues to block 607, by sending, through a first middleware portion the set of data to a third middleware portion of the alternate application on the network. In some embodiments, alternate application also has a smart stub to facilitate testing. In such an embodiment, the third logic code portion of the alternate application does not need to be configured to handle the call of the upstream application. Instead, the process continues to block 608, whereby the third smart stub returns a simulated response to the first logic code portion.

FIG. 7 illustrates a process 007 for performing dynamic updates of the middleware portions within the applications in the system. The process begins at step 701, by detecting a condition that necessitates a change in configuration of the first middleware portion. In some embodiments, the condition may be an addition or removal of an application within the system. In some embodiments, the condition may be user-imposed for various reasons, including implementing bug fixes, implementing additional features, or implementing compatibility with new application interfaces in response to changing industry standards.

The process continues to block 702, by receiving a first update from an update server. In some embodiments, the first update corresponds to the first middleware portion of the upstream application. In some embodiments, the update server is connected to the applications within the system via a network. In some embodiments, the update server is configured to delivery individualized updates to the middleware portions within the system. In other embodiments, the update server is configured to delivery updates that at least partially contain unified code that is shared amongst the middleware portions.

The process continues to block 703, by dynamically modifying the configuration of the first middleware portion independently of the first logic code portion. In some embodiments, the middleware portion is modified without changing the logic code portion. In other embodiments, the middleware portion may be modified in parallel with the logic code portion.

The process continues to block 704, by detecting a condition that necessitates a change in configuration of the second middleware portion. Such a condition may include any of the examples given above.

The process continues to block 705, by receiving a second update from the update server. In some embodiments, the second update corresponds to the second middleware portion of the downstream application. In some embodiments, the second update is tailored to the second middleware portion. In other embodiments, the second update is a general update that is applied to all middleware portions within the system.

Finally, the process continues to block 706, by dynamically modifying the configuration of the second middleware portion independently of the second logic code portion. In some embodiments, the first middleware portion and the second middleware portion may delay applying the update until both middleware portions are ready to apply the update. In this way, the system may ensure consistency in inter-application compatibility by preventing disparity in middleware versions.

FIG. 8 is a combination symbol and block diagram that illustrates the relationships between the hardware and software in the system 008 according to one embodiment of the invention. Referring now to the symbol diagram, a first computing device 801, a second computing device 802, and an update server 300 are in operative communication with one another via a network 130. It should be understood that "computing device" encompasses a broad range of devices, including, but not limited to, personal desktop computers, laptop computers, servers, routers, smartphones, digital tablets, smart watches, smart appliances, ATM's, and the like.

Referring now to the block diagram portion of FIG. 8, which corresponds to the symbol diagram, the first computing device 801 comprises a network communication interface 810 operatively coupled to a processing device 820, which is operatively coupled to a memory device 930, the memory device 930 comprising the upstream application 150, which in turn comprises the first logic code portion 100 and the first middleware portion 120 operatively coupled to the common application framework 110. The network communication interface 810 contains devices that allow the first computing device 801 to connect to the network 130.

The first computing device 801 is, through the network 130, in operative communication with the second computing device 802, which comprises a network communication interface 811 that is operatively coupled to a processing device 821, which is operatively coupled to a memory device 931, the memory device 931 comprising the downstream application 151, which in turn comprises the second logic code portion 101 and the second middleware portion 121 operatively coupled to the common application framework 111.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 7286US1.014033.2867 | To be assigned | SYSTEM FOR INCREASING INTRA-APPLICATION PROCESSING EFFICIENCY BY TRANSMITTING FAILED PROCESSING WORK OVER A PROCESSING RECOVERY NETWORK FOR RESOLUTION | Concurrently herewith |
| 7354US1.014033.2879 | To be assigned | SYSTEM FOR INCREASING INTER-APPLICATION PROCESSING EFFICIENCY BY TRANSMITTING FAILED PROCESSING WORK OVER A PROCESSING RECOVERY NETWORK FOR RESOLUTION | Concurrently herewith |

What is claimed is:

1. A system for increasing efficiency of communication between applications, comprising:

an upstream networked system comprising an upstream processor, a memory device, and a communication device, and an upstream application stored in the memory, comprising computer-readable instructions comprising:
a first logic code portion; and
a first embedded code portion comprising a common application framework and a first middleware portion, the first logic code being only in communication with the first middleware portion via the common application framework of the first embedded code portion, wherein the first logic code being only in communication with the first middleware portion via the common application framework portion provides for the first middleware portion to be modified absent a need to modify the first logic code portion; and
a downstream networked system operatively connected with the upstream networked system over the network, the downstream networked system comprising a downstream processor, a memory device, and a communication device, and a downstream application stored in the memory, comprising computer-readable instructions comprising:
a second logic code portion; and
a second embedded code portion comprising the common application framework and a second middleware portion, the second logic code being only in communication with the second middleware portion via the common application framework of the second embedded code portion, wherein the second logic code being only in communication with the second middleware portion via the common application framework portion provides for the second middleware portion to be modified absent a need to modify the second logic code portion,
wherein the first middleware portion when executed by the upstream processor causes the upstream processor to:
receive, from the first logic code portion, a set of data to be communicated to the downstream application;
detect a condition that renders a first communications protocol unavailable, wherein the condition is one of (i) a failure of peripheral services or application responsible for facilitating communications vi the first communications protocol, (ii) a latency in the response time of the downstream application, or (iii) a temporary restriction on using the first communications protocol; and
transform the set of data into a format capable of being read by the second middleware portion; and
transmit, over the network absent modification of the first logic code portion, the set of data to the second middleware portion via the second communications protocol, and
wherein the second middleware portion when executed by the downstream processor causes the downstream processor to:
detect the condition that renders the first communications protocol unavailable;
receive, over the network absent modification of the second logic code portion, the set of data from the first middleware portion via the second communications protocol;
transform the set of data into a format capable of being read by the second logic code portion; and communicate the set of data to the second logic code portion.

2. The system of claim 1, wherein the common application framework is configured to select the second communications protocol based on communications protocol availability for both the upstream application and downstream application.

3. The system of claim 1, wherein the first communications protocol comprises IBM MQ.

4. The system of claim 1, wherein the second communications protocol comprises HTTP.

5. The system of claim 1, further comprising:
a first smart stub embedded in the common application framework of the first embedded code portion, wherein the first smart stub is in communication with the first middleware portion and the first logic code portion, and is configured to cause the upstream processor to:
detect, via a smart stub manager, that communication with the downstream application portion is unavailable; and
enable a data transfer testing mode.

6. The system of claim 5, wherein the data transfer testing mode comprises configuring the first smart stub to cause the upstream processor to:
receive the set of data from the first logic code portion; and
return a simulated response to the first logic code portion.

7. The system of claim 5, further comprising an alternate networked system operatively connected with the upstream networked system over a network, the alternate networked system comprising an alternate processor, a memory device, and a communication device, and an alternate application stored in the memory, comprising computer-readable instructions comprising:
a third logic code portion; and
a third embedded code portion comprising the common application framework and a third middleware portion, the third logic code being only in communication with the third middleware portion via the common application framework of the third embedded code portion, wherein the third logic code being only in communication with the third middleware portion via the common application framework portion provides for the third middleware portion to be modified absent a need to modify the third logic portion;
wherein the data transfer testing mode comprises configuring the first smart stub to cause the upstream processor to:
receive the set of data from the first logic code portion; and
configure the first middleware portion to send, over the network, the set of data to a third middleware portion of the alternate application, wherein the third middleware portion is configured by a third smart stub to cause the alternate processor to send, over the network, a simulated response to the first logic code portion.

8. The system of claim 5, wherein the data transfer testing mode comprises configuring the first smart stub to cause the upstream processor to:
receive the set of data from the first logic code portion; and
configure the first middleware portion to send, over the network, the set of data to the second middleware portion, wherein the second middleware portion is configured by a second smart stub to cause the downstream processor to send, over the network, a simulated response to the first logic code portion.

9. The system of claim 1, wherein the first middleware portion is further configured to cause the upstream processor to:
detect a condition that necessitates a change in configuration of the first middleware portion;
receive a first update from an update server; and
dynamically modify the configuration of the first middleware portion independently of the first logic code portion;
wherein the second middleware portion is further configured to cause the downstream processor to:
detect a condition that necessitates a change in configuration of the second middleware portion;
receive a second update from the update server; and
dynamically modify the configuration of the second middleware portion independently of the second logic code portion.

10. A computer-implemented method for increasing efficiency of communication between applications executed by an upstream processor of an upstream networked system and a downstream processor of a downstream networked system, wherein the upstream networked system comprises a memory device and a communication device, wherein an upstream application is stored on the memory device, the upstream application comprising:
a first logic code portion; and
a first embedded code portion comprising a common application framework and a first middleware portion, first logic code being only in communication with the first middleware portion via the common application framework of the first embedded code portion, wherein the first logic code being only in communication with the first middleware portion via the common application framework portion provides for the first middleware portion to be modified absent a need to modify the first logic portion,
wherein the downstream networked system comprises a memory device and a communication device, wherein the downstream application is stored on the memory device, the downstream application comprising:
a second logic code portion; and
a second embedded code portion comprising a common application framework and a second middleware portion, the second logic code being only in communication with the second middleware portion via the common application framework of the second embedded code portion, wherein the second logic code being only in communication with the second middleware portion via the common application framework portion provides for the second middleware portion to be modified absent a need to modify the second logic portion, said method comprising:
receiving, by the upstream processor executing the first middleware portion, a set of data from the first logic code portion at the first middleware portion over a network;
detecting, by the upstream processor executing the first middleware portion, a condition that renders a first communications protocol unavailable, wherein the condition is one of (i) a failure of peripheral services or application responsible for facilitating communications vi the first communications protocol, (ii) a latency in the response time of the downstream application, or (iii) a temporary restriction on using the first communications protocol;

transforming, by the upstream processor executing the first middleware portion, the set of data into a format that is readable by the second middleware portion;

transmitting, by the upstream processor executing the first middleware portion absent modification of the first logic code portion, the set of data to the second middleware portion over a network via the second communications protocol;

detecting, by the downstream processor executing the second middleware portion, the condition that renders the first communications protocol unavailable;

receiving, by the downstream processor executing the second middleware portion absent modification of the second logic portion, the set of data from the first middleware portion at the second middleware portion over the network via the second communications protocol;

transforming, by the downstream processor executing the second middleware portion, the set of data into a format that is readable by the second logic code portion; and communicating, by the downstream processor executing the second middleware portion, the data to the second logic code portion.

11. The computer-implemented method of claim 10, further comprising:

selecting, by the common application framework executed by both the upstream processor and the downstream processor, the second communications protocol based on communications protocol availability for both the upstream application and downstream application.

12. The computer-implemented method of claim 10, wherein the first communications protocol comprises IBM MQ.

13. The computer-implemented method of claim 10, wherein the second communications protocol comprises HTTP.

14. The computer-implemented method of claim 10, further comprising:

detecting, by the first middleware portion executed by the upstream processor, via a smart stub manager, that communication with the downstream application is unavailable; and enabling, by the first middleware portion executed by the upstream processor, a data transfer testing mode via a first smart stub embedded in the common application framework.

15. The computer-implemented method of claim 14, further comprising:

processing in the data transfer testing mode, by the first smart stub executed by the upstream processor, comprising:

receiving the set of data from the first logic code portion; and returning a simulated response to the first logic code portion.

16. The computer-implemented method of claim 14, further comprising:

processing in the data transfer testing mode, by the first smart stub executed by the upstream processor, comprising:

receiving the set of data from the first logic code portion; and configuring the first middleware portion to send, over the network, the set of data to a third middleware portion of an alternate application, wherein the third middleware portion is configured by a third smart stub to cause an alternate processor send, over the network, a simulated response to the first logic code portion.

17. The computer-implemented method of claim 14, further comprising:

processing in the data transfer testing mode, by the first smart stub executed by the upstream processor, comprising:

receiving the set of data from the first logic code portion; and configuring the first middleware portion to send, over the network, the set of data to the second middleware portion, wherein the second middleware portion is configured by a second smart stub to cause the downstream processor to send, over the network, a simulated response to the first logic code portion.

18. The computer-implemented method of claim 10, further comprising:

detecting, by the first middleware portion executed by the upstream processor, a condition that necessitates a change in configuration of the first middleware portion;

receiving, by the first middleware portion executed by the upstream processor, a first update from an update server;

dynamically modifying, by the first middleware portion executed by the upstream processor, the configuration of the first middleware portion independently of the first logic code portion;

detecting, by the second middleware portion executed by the downstream processor, a condition that necessitates a change in configuration of the second middleware portion;

receiving, by the second middleware portion executed by the downstream processor, a second update from the update server; and dynamically modifying, by the second middleware portion executed by the downstream processor, the configuration of the second middleware portion independently of the second logic code portion.

* * * * *